United States Patent
Huang

(10) Patent No.: US 11,338,465 B2
(45) Date of Patent: May 24, 2022

(54) BAND SAW MACHINE

(71) Applicant: BLUE STEEL MACHINERY CO., Taichung (TW)

(72) Inventor: Yu-Sheng Huang, Taichung (TW)

(73) Assignee: BLUE STEEL MACHINERY CO., Taichung (TW)

( * ) Notice: Subject to any disclaimer, the term of this patent is extended or adjusted under 35 U.S.C. 154(b) by 257 days.

(21) Appl. No.: 16/726,330

(22) Filed: Dec. 24, 2019

(65) Prior Publication Data

US 2020/0361112 A1   Nov. 19, 2020

(30) Foreign Application Priority Data

May 13, 2019   (TW) .................................. 108116418

(51) Int. Cl.
  *B27B 13/02*   (2006.01)
  *B27B 31/00*   (2006.01)
  *B27B 13/16*   (2006.01)

(52) U.S. Cl.
  CPC .............. *B27B 13/02* (2013.01); *B27B 13/16* (2013.01); *B27B 31/006* (2013.01)

(58) Field of Classification Search
  CPC ....... B27B 13/02; B27B 13/16; B27B 31/006; B27B 15/08; B27B 15/02; B27B 1/002; B23D 59/006; B23D 53/026; B26D 7/1854; B26D 7/18; B26D 1/46
  USPC ...... 83/820, 98, 370, 165, 39; 452/135, 149, 452/150, 155, 156, 160, 151
  See application file for complete search history.

(56) References Cited

U.S. PATENT DOCUMENTS

| | | | | |
|---|---|---|---|---|
| 2,669,261 | A * | 2/1954 | Bowers ................. | B23D 53/04 83/800 |
| 4,285,257 | A * | 8/1981 | Eberle .................... | H01M 4/84 83/167 |
| 5,286,230 | A * | 2/1994 | Nienstedt ............... | A22C 25/18 452/170 |
| 6,772,665 | B1 * | 8/2004 | Hurdle, Jr. .......... | B23D 59/002 144/356 |
| 9,687,006 | B1 * | 6/2017 | Buckles ................ | A22C 17/02 |
| 2004/0007110 | A1 * | 1/2004 | Long .................... | B26D 7/0625 83/435 |

(Continued)

FOREIGN PATENT DOCUMENTS

| | | |
|---|---|---|
| CN | 203371604 | 1/2014 |
| CN | 205343321 | 6/2016 |

(Continued)

OTHER PUBLICATIONS

Search Report for TW108116418 dated Sep. 9, 2019, 2 pages.

*Primary Examiner* — Ghassem Alie
(74) *Attorney, Agent, or Firm* — Nixon & Vanderhye PC

(57) ABSTRACT

A band saw machine is adapted for cutting a lumber, and includes frame body unit, a transport unit, a hold-down unit, a cutting unit and a drive unit. The transport unit includes an endless conveyor belt extending in a front-rear direction through the frame body unit for transporting the lumber. The hold-down unit includes an endless hold-down belt extending in the front-rear direction through the frame body unit. The endless conveyor belt and the endless hold-down belt are driven by the drive unit to rotate synchronously to carry the lumber to be cut by the cutting unit.

8 Claims, 11 Drawing Sheets

(56) References Cited

U.S. PATENT DOCUMENTS

| | | | | |
|---|---|---|---|---|
| 2010/0031798 | A1* | 2/2010 | Wang | B27B 15/08 |
| | | | | 83/800 |
| 2011/0197729 | A1* | 8/2011 | Cosgrove | B23P 19/041 |
| | | | | 83/39 |
| 2016/0008995 | A1* | 1/2016 | Reifenhaeuser | B26D 7/06 |
| | | | | 83/42 |
| 2019/0061027 | A1* | 2/2019 | Stolzer | B23D 55/088 |

FOREIGN PATENT DOCUMENTS

| | | |
|---|---|---|
| CN | 207373333 | 5/2018 |
| CN | 207724510 | 8/2018 |

\* cited by examiner

BAND SAW MACHINE

CROSS-REFERENCE TO RELATED APPLICATIONS

This application claims priority of Taiwanese Patent Application No. 108116418, filed on May 13, 2019.

FIELD

The disclosure relates to a cutting machine, more particularly, to a wood cutting band saw machine.

BACKGROUND

Referring to FIGS. 1 and 2, a conventional band saw machine includes an upright base support 11, a cutting unit 12 disposed on the base support 11, a transport unit 13 extending through the upright base support 11, and a hold-down unit 14 coupled to the upright base support 11 above the transport unit 13.

The upright base support 11 includes a base plate 111, a rear plate 112 spaced from the base plate 111 in a front-rear direction (A), a surrounding wall 113 connected between the base plate 111 and the rear plate 112, an inlet port 114 extending through the base plate 111 in the front-rear direction (A), and an outlet port 115 extending through the rear plate 112 in the front-rear direction (A) and aligned with the inlet port 114.

The cutting unit 12 includes two cutter modules 121 disposed on the base plate 111 and spaced apart from each other in an up-down direction (B). Each cutter module 121 contains two wheels 122 rotatably disposed on the rear of the base plate 111, and a continuous band saw blade 123 driven by and travelling around the two wheels 122. The continuous band saw blade 123 of each cutter module 121 has a cutting section travelling alongside the inlet port 114.

The transport unit 13 includes a conveyor table 131 connected to the upright base support 11 and extending in the front-rear direction (A), two transport pulleys 132 connected to the conveyor table 131, and a continuous conveyor belt 133 driven by and travelling around the two transport pulleys 132.

The hold-down unit 14 includes a front axle mounting bracket 141 fixed to the base plate 111 and spaced apart from the conveyor belt 133 in the up-down direction (B), a front hold-down wheel 142 rotatably connected to a lower end of the front axle mounting bracket 141, a support frame 143 disposed behind the rear plate 112 and extending upward from the conveyor table 131, a rear axle mounting bracket 144 fixed to the support frame 143 and spaced apart from the conveyor belt 133 in the up-down direction (B), and a rear hold-down wheel 145 rotatably connected to a lower end of the rear axle mounting bracket 144.

When in use, a lumber 15 is laid on the conveyor belt 133 at upstream of the base plate 111. The conveyor belt 133 is driven to rotate by the pulleys 132 for moving the lumber 15 towards the inlet port 114. When the lumber 15 is moved under the front hold-down wheel 142, the front hold-down wheel 142 will be in frictional contact with and driven to rotate by the lumber 15, such that the lumber 15 is clamped between the front hold-down wheel 142 and the conveyor belt 133 and restricted in the up-down direction (B), and that the stability of the lumber 15 during saw cutting is enhanced.

When the lumber 15 is cut into three pieces, the three pieces will continue to be carried downstream to under the rear hold-down wheel 145 by the conveyor belt 133. Likewise, the rear hold-down wheel 142 will be in frictional contact with and driven to rotate by the three pieces of the lumber 15, and the three pieces of the lumber 15 are clamped between the rear hold-down wheel 145 and the conveyor belt 133 and restricted in the up-down direction (B).

The conventional band saw machine suffers the following disadvantages when in use. First, when the front hold-down wheel 142 and the rear hold-down wheel 145 contact the lumber 15, the moving speed of the lumber 15 is slowed down, which will in turn deteriorate the cutting efficiency. In addition, sawdust (not shown) produced during cutting the lumber 15 will accumulate on the band saw blade 123 and the conveyor belt 133, and need to be cleaned regularly, otherwise the cutting effect will be affected.

SUMMARY

Therefore, the object of the disclosure is to provide a wood cutting band saw machine that addresses at least one of the disadvantages of the prior art.

According to the disclosure, a band saw machine is adapted for cutting a lumber. The band saw machine includes a frame body unit, a transport unit, a hold-down unit, a cutting unit, and a drive unit.

The frame body unit includes a support frame module. The support frame module has an upright base plate that is formed with an outlet port extending therethrough in a front-rear direction.

The transport unit includes a conveyor table, a transport pulley set, and an endless conveyor belt. The conveyor table is connected to the frame body unit and extends in the front-rear direction through the outlet port. The transport pulley set includes a plurality of transport pulley members mounted on the conveyor table and spaced apart from each other in the front-rear direction. The endless conveyor belt is trained on the plurality of transport pulley members and is driven rotatably by the transport pulley members to convey the lumber.

The hold-down unit includes a track frame, a hold-down belt roller set, and an endless hold-down belt. The track frame is connected to the frame body unit and extends in the front-rear direction through the outlet port. The hold-down belt roller set includes a plurality of hold-down belt roller members mounted to the track frame and spaced apart from each other in the front-rear direction. The endless hold-down belt is trained on the plurality of hold-down belt roller members and is driven rotatably by the hold-down belt roller members.

The cutting unit is connected to the support frame module and includes a first cutter module including a first wheel set and a first continuous band saw blade. The first wheel set includes a plurality of first wheel members connected to the base plate and spaced apart from each other in a left-right direction which is perpendicular to the front-rear direction. The first continuous band saw blade is trained on the plurality of first wheel members and is driven rotatably by the first wheel members. The first continuous band saw blade has a cutting section that travels alongside the outlet port, that is disposed between the transport unit and the hold-down unit, and that is adapted to cut the lumber.

The drive unit includes a transport unit drive motor and a hold-down unit drive motor that are connected respectively to the transport pulleys set and the hold-down belt roller set, and that are operable for respectively and synchronously driving rotations of the transport pulley members and the hold-down belt roller members to rotate the endless conveyor belt and the endless hold-down belt. The drive unit further includes a first main drive motor that is connected to the first wheel set and that is operable for driving rotation of the first wheel members to rotate the first continuous band saw blade.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
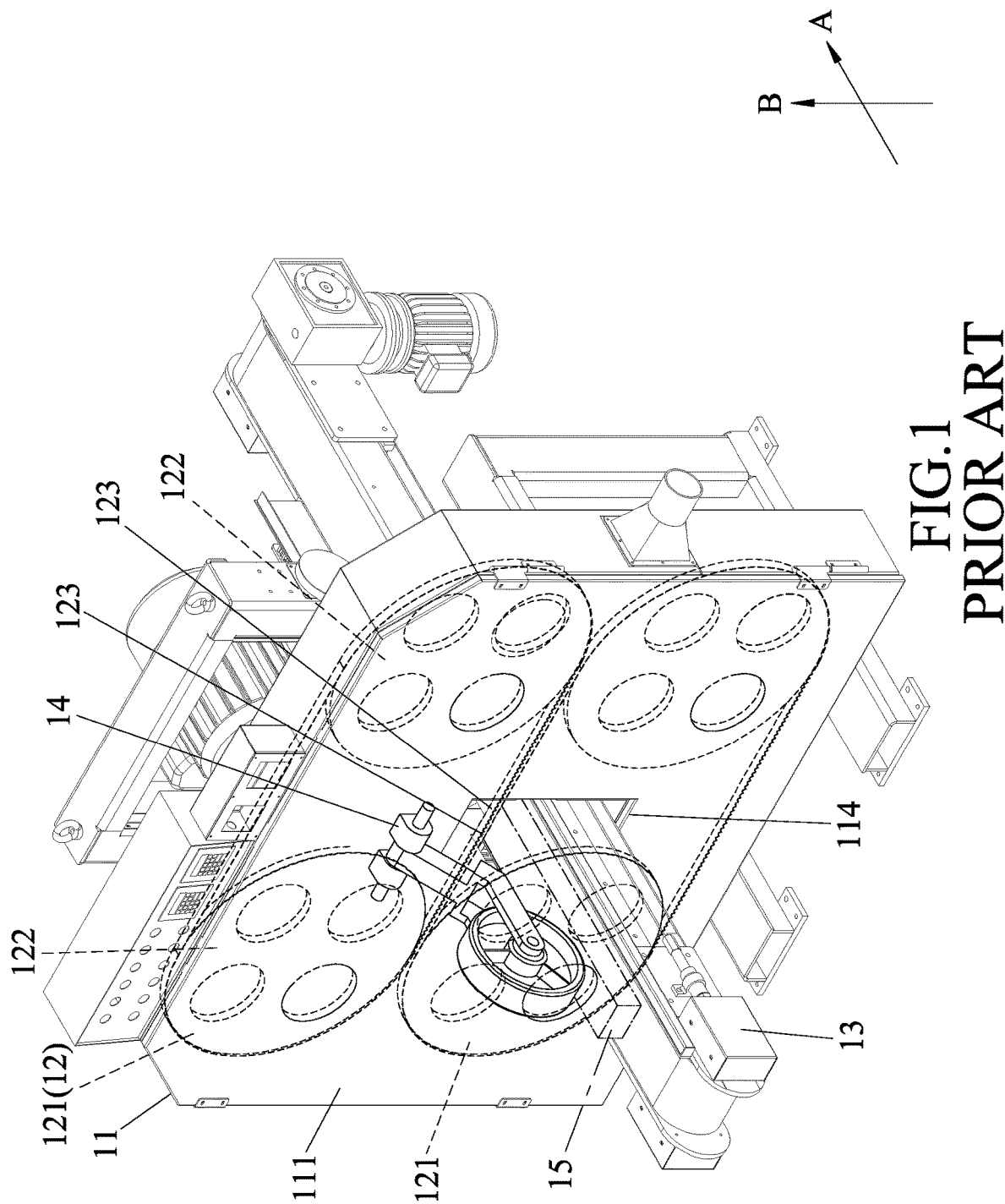
FIG. 1 is a perspective view of a conventional band saw machine.
Figure 2:
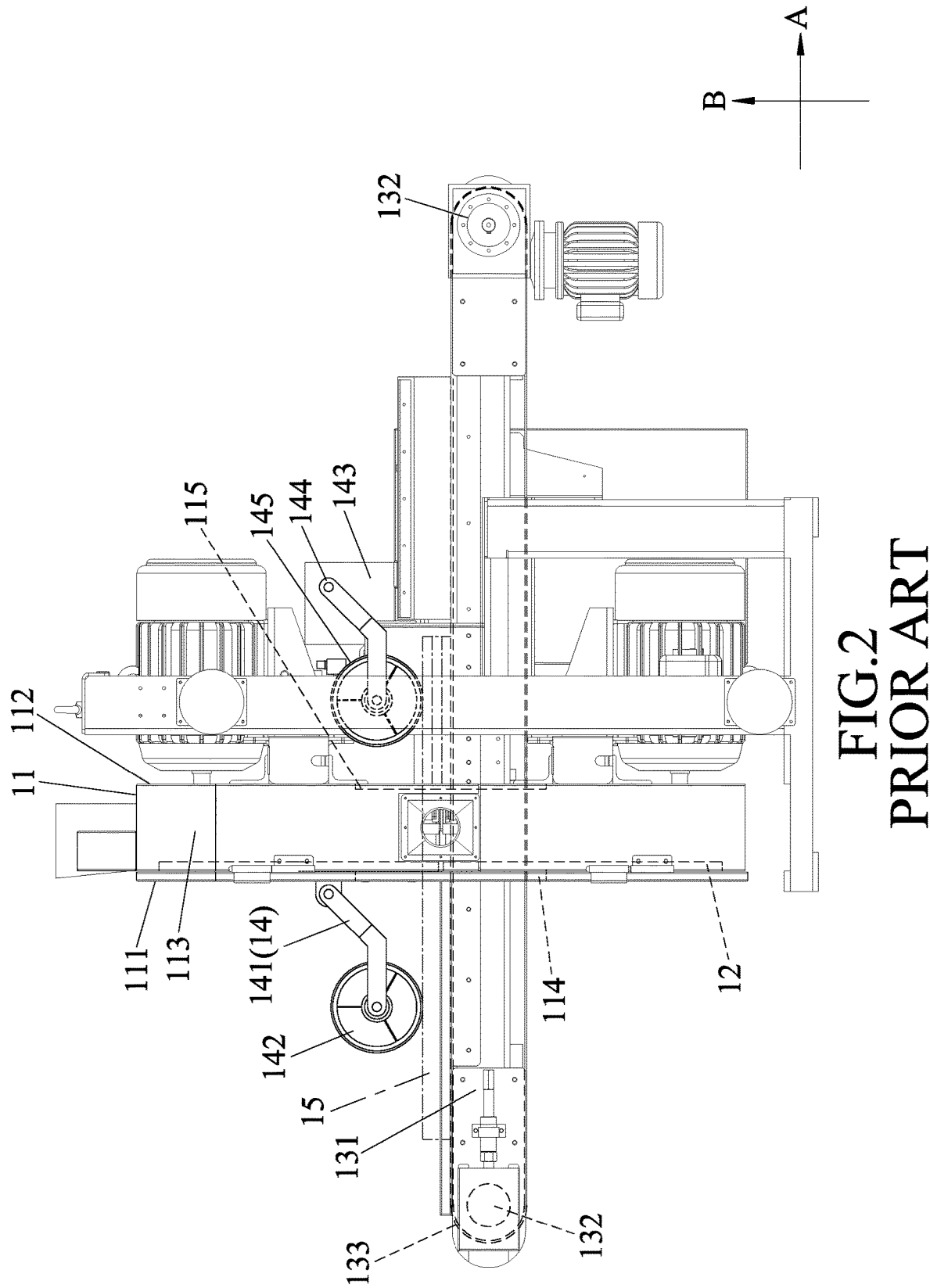
FIG. 2 is a side view of the conventional band saw machine.
Figure 3:
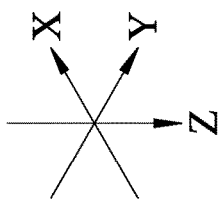
FIG. 3 is a perspective view of an embodiment of the band saw machine of the present invention.
Figure 3:
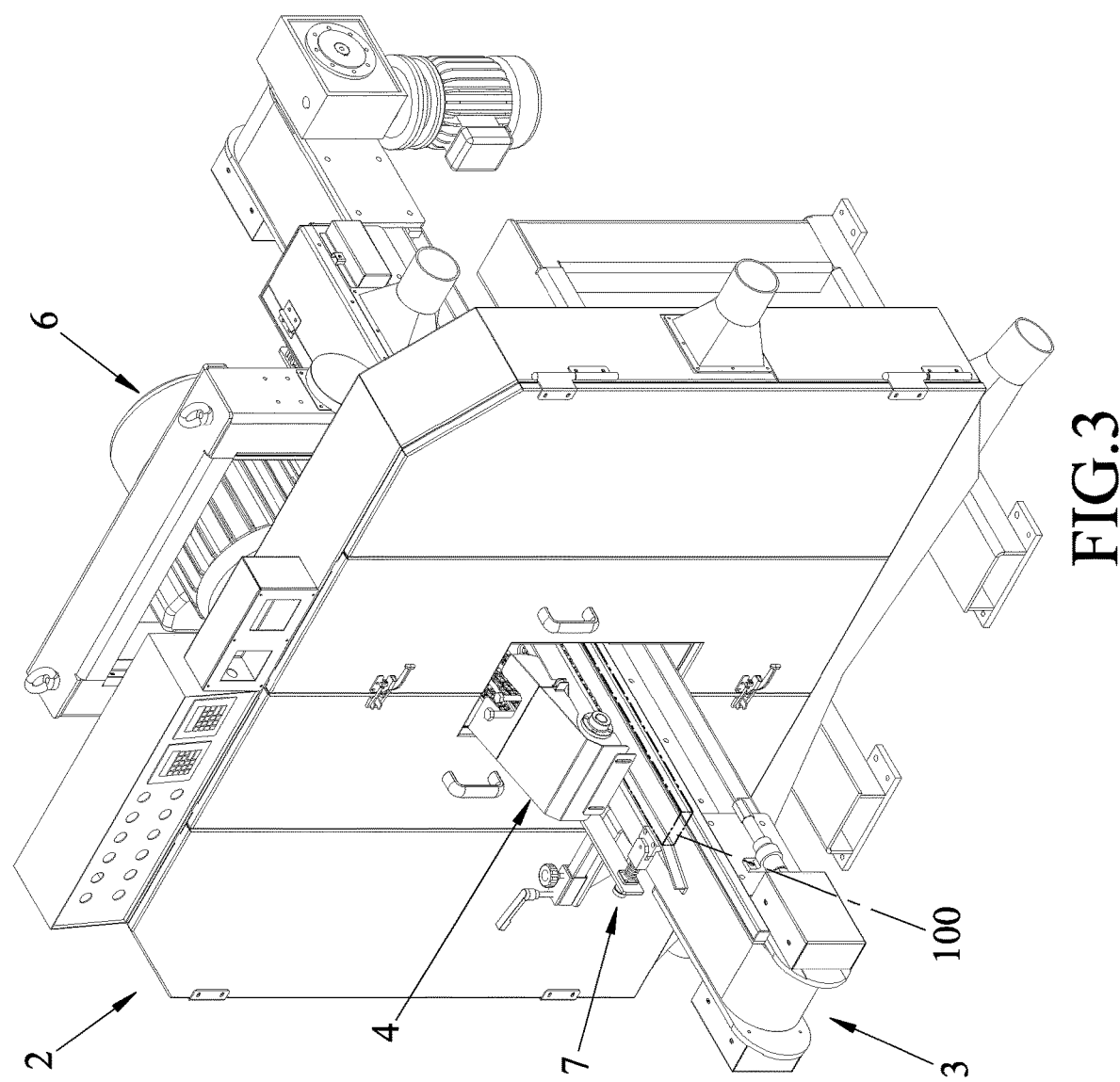
Figure 4:
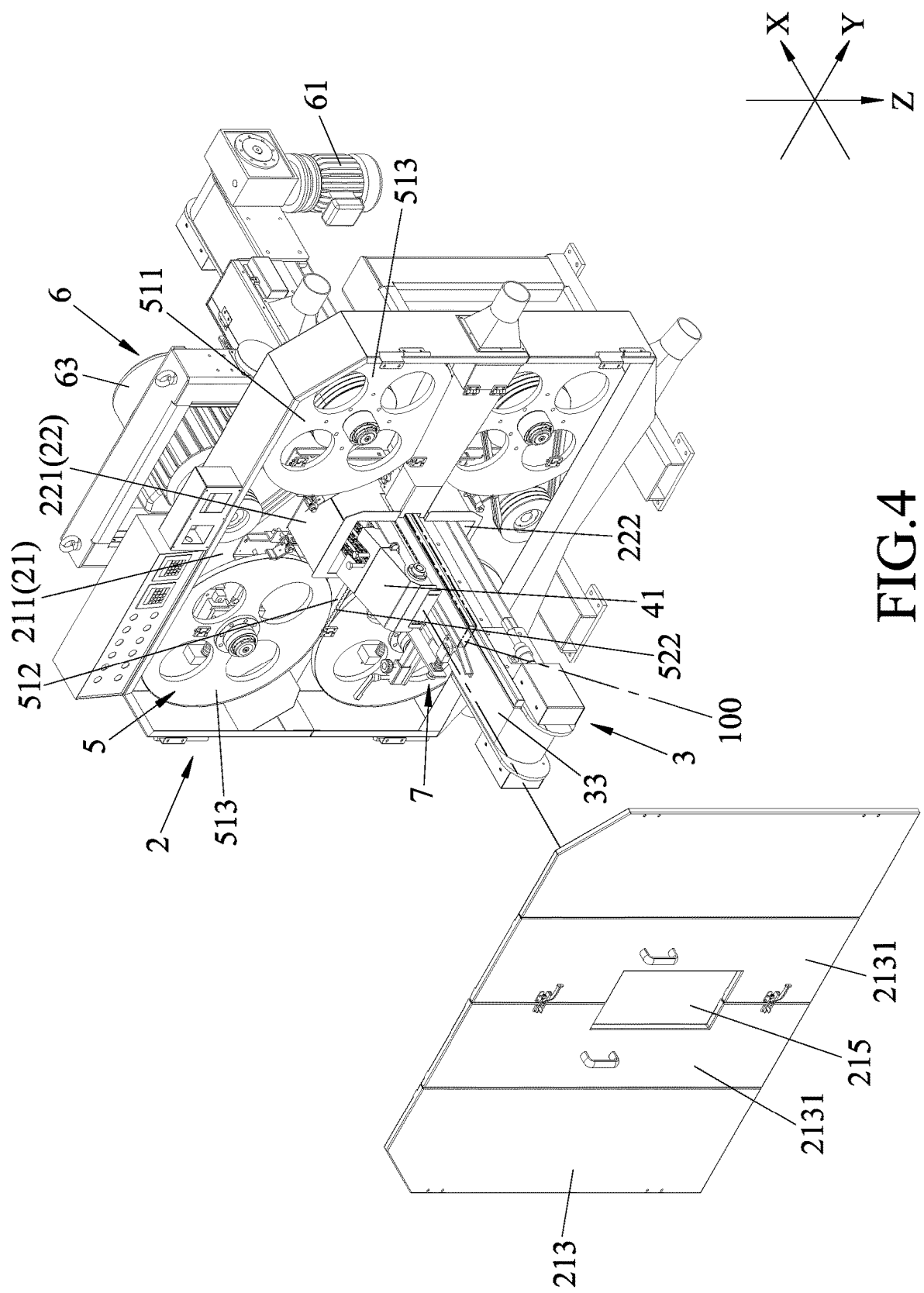
FIG. 4 is a partly exploded perspective view of the embodiment.
Figure 5:
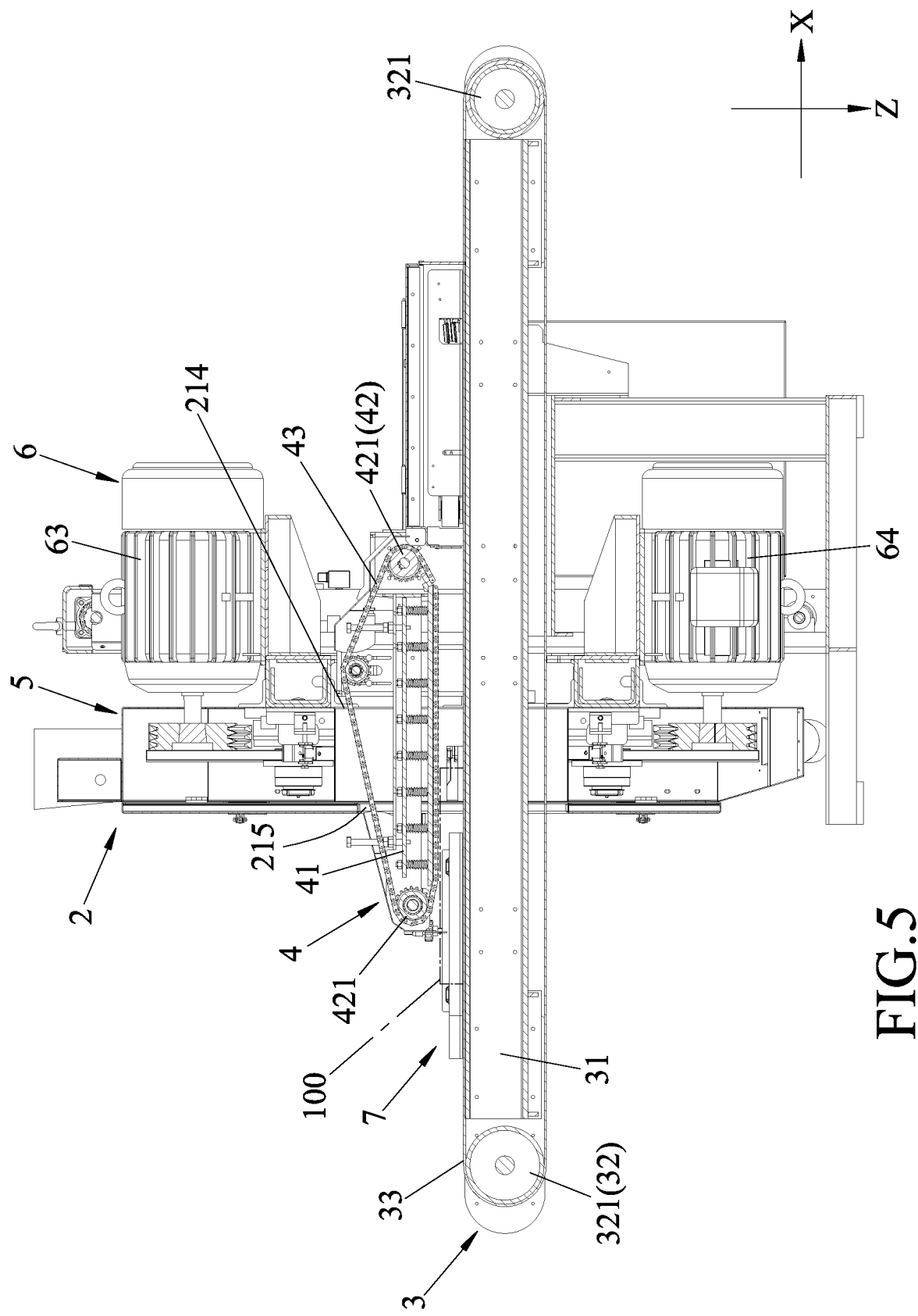
FIG. 5 is a sectional view of the embodiment.

As shown in FIGS. 3, 4 and 5, the embodiment of the band saw machine according to the present disclosure is suitable for cutting a lumber 100 and adapted to be connected with an exhaust fan (not shown). The band saw machine includes a frame body unit 2, a transport unit 3, a hold-down unit 4, a cutting unit 5, a drive unit 6, and a feed vise unit 7.

Figure 6:
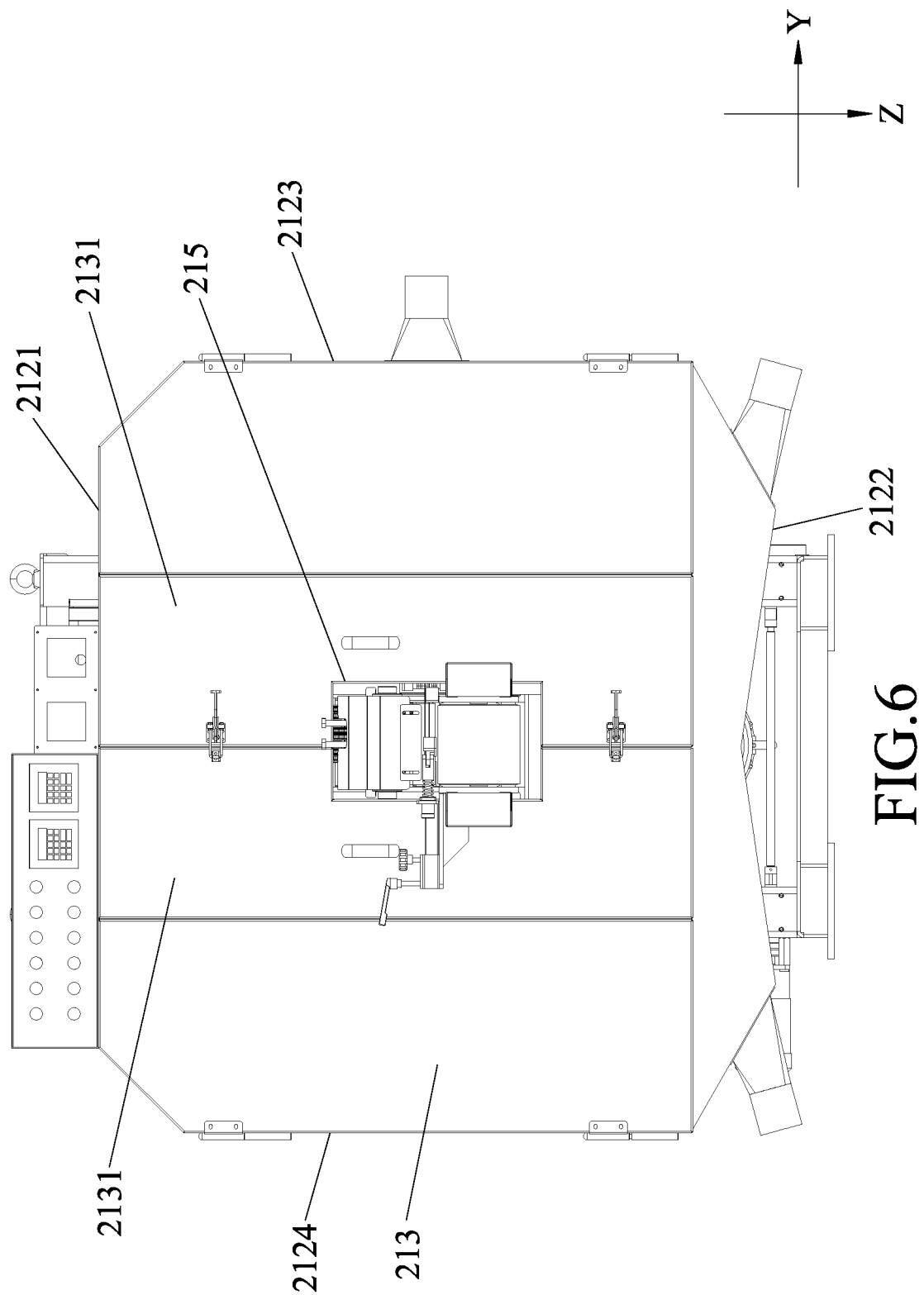
FIG. 6 is a front view of the embodiment.
Figure 7:
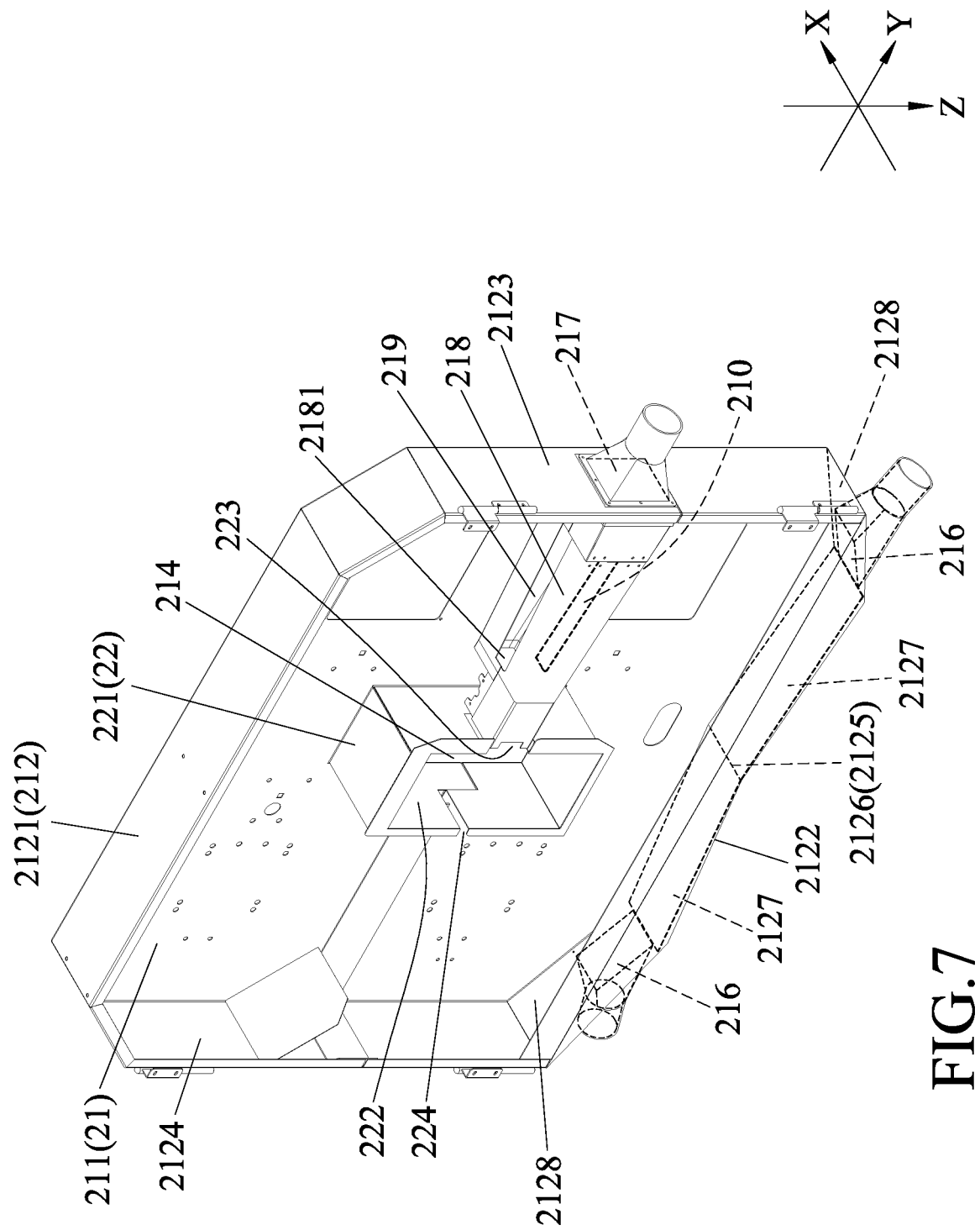
FIG. 7 is a fragmentary perspective view of a frame body unit of the embodiment.

Referring to FIGS. 4, 6 and 7, the frame body unit 2 includes a support frame module 21 and a cutting shroud module 22. The support frame module 21 has an upright base plate 211 formed with an outlet port 214 that extends therethrough in a front-rear direction (X), a surrounding wall 212 projecting forward from a periphery of the base plate 211, and a cover plate 213 connected to a front end of the surrounding wall 212 and formed with an inlet port 215 that extends therethrough in the front-rear direction (X) and that is in alignment with the outlet port 214. The support frame module 21 further has two sawdust discharge ports 216 extending through the surrounding wall 212 respectively on the left and right sides, an air vent 217 extending through the surrounding wall 212 and adapted to be connected to the exhaust fan, and a vent housing 218 connected to the base plate 211 and cooperating with the base plate 211 to define an air guide duct 2181 therebetween. The air guide duct 2181 has two opposite ends communicating respectively with the air vent 217 and the cutting shroud module 22. The support frame module 21 further has an upper aperture 219 formed through a top of the vent housing 218 and communicating with the air guide duct 2181, and a lower aperture 210 formed through a bottom of the vent housing 218 and communicating with the air guide duct 281.

The surrounding wall 212 has a top wall portion 2121, a bottom wall portion 2122 disposed under the top wall portion 2121, and first and second side wall portions 2123, 2124 connected between the top wall portion 2121 and the bottom wall portion 2122. The air vent 217 extending through the first side wall portion 2123 of the surrounding wall 212. The bottom wall portion 2122 has a generally inverted V-shaped profile section 2125 formed by a central crest 2126, two inclined segments 2127 that extend respectively, obliquely and downwardly from opposite ends of the central crest 2126, and two extension segments 2128 that extend respectively from lower ends of the two inclined segments 2127. The extension segments 2128 extend respectively, obliquely and upwardly from the inclined segments 2127. The sawdust discharge ports 216 extend respectively through the extension segments 2128 and located respectively adjacent to the inclined segments 2127.

The cover plate 213 has two door panels 2131 defining the inlet port 215 and operable between an open position and a closed position.

The cutting shroud module 22 is connected to the front of the base plate 211, and has a shroud body 221 disposed circumferentially around the outlet port 214, extending forward and parallel to the front-rear direction (X) from the base plate 211, and defining a feed channel 222 that communicates with the inlet port 215 and the outlet port 214. The shroud body 221 has a first port 223 and a second port 224 that are formed respectively on opposite sides of the shroud body 221 in a left-right direction (Y) which is perpendicular to the front-rear direction (X), and that communicate with the feed channel 222. The first side wall portion 2123 and the second side wall portion 2124 of the surrounding wall 212 face respectively the first port 223 and the second port 224.

The opposite ends of the air guide duct 218 communicate respectively with the first port 223 and air vent 217 for exhausting sawdust through the air vent 217 with the suction of the exhaust fan.

Figure 8:
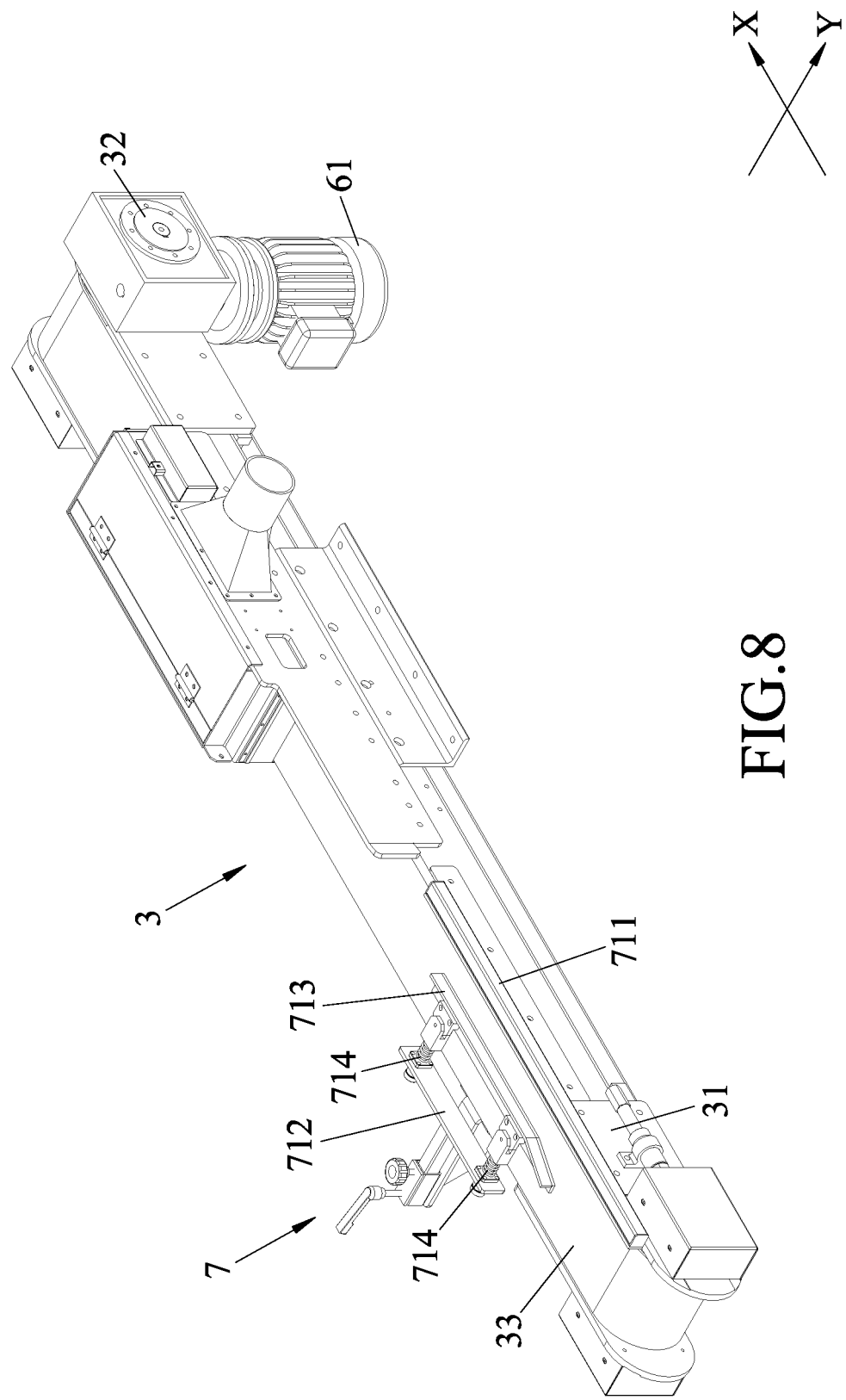
FIG. 8 is a perspective view of a transport unit, a transport unit drive motor and a feed vise unit of the embodiment.

Referring to FIGS. 4, 5 and 8, the transport unit 3 includes g a conveyor table 31 connected to the frame body unit 2 and extending in the front-rear direction (X) through the inlet port 215 and the outlet port 214 and extending through the feed channel 222, a transport pulley set 32 including two transport pulley members 321 that are mounted on the conveyor table 31 and that are spaced apart, from each other in the front-rear direction (X), and an endless conveyor belt 33 trained on the transport pulley members 32 and driven rotatably by the two transport pulley members 321 to convey the lumber 100 from upstream of the inlet port 215 to downstream of the outlet port 214. It is noted that, in this description, upstream/upstream side or front refers to the direction where the lumber is fed from, while downstream/downstream side or rear refers to the opposite direction where the lumber is going to get cut.

Figure 9:
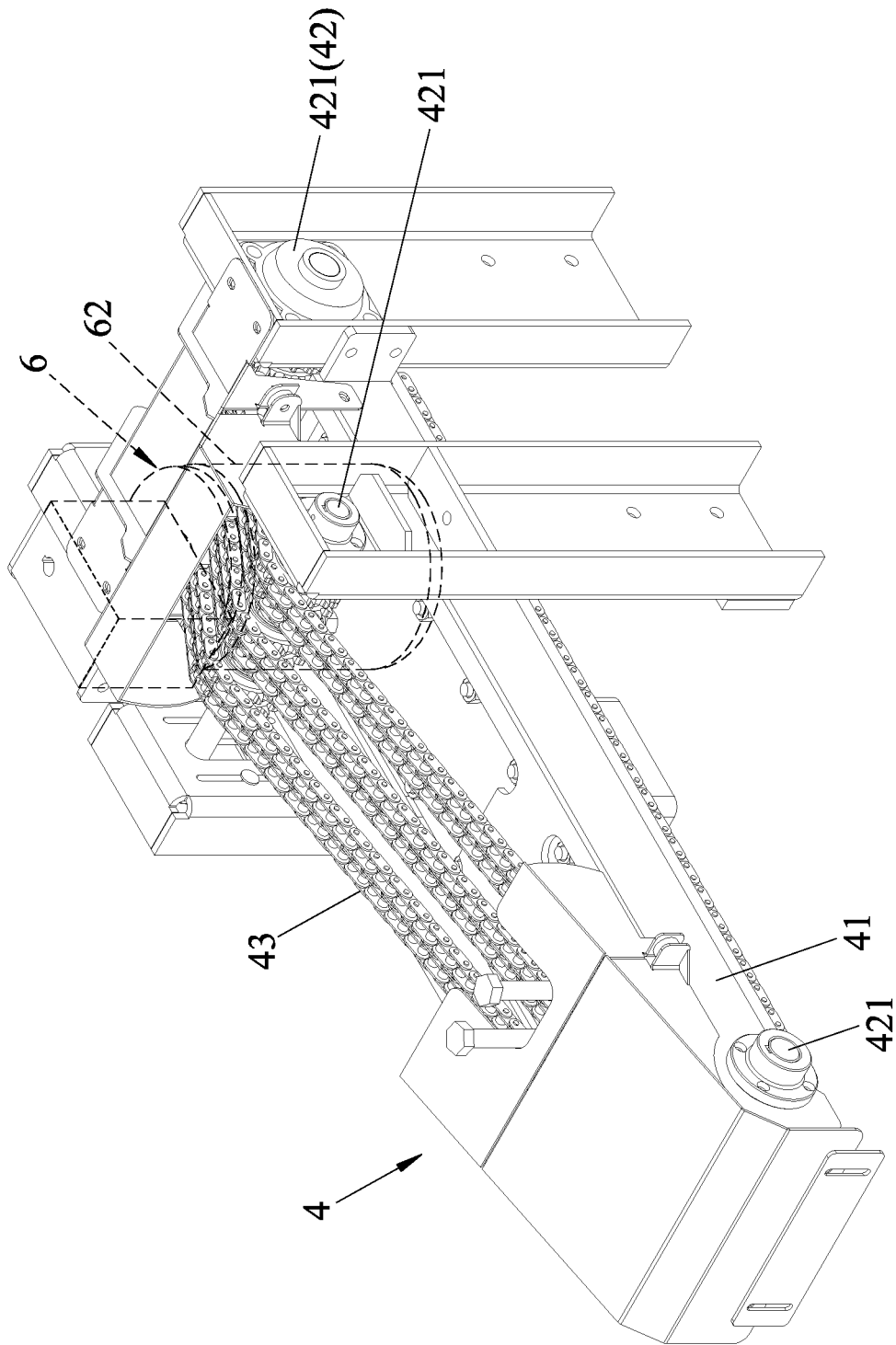
FIG. 9 is a perspective view of a hold-down unit and a hold-down unit drive motor of the embodiment.

Referring to FIGS. 4, 5 and 9, the hold-downed unit 4 includes a track frame 41 connected to the frame body unit 2 and extending in the front-rear direction (X) through the inlet port 215 and the outlet port 214 and extending through the feed channel 222, a hold-down belt roller set 42 including three hold-down belt roller members 421 that are pivotally mounted to the track frame 41 and that are spaced apart from each other in the front-rear direction (X), and an endless hold-down belt 43 trained on the hold-down belt roller members 421 and driven rotatably by the three hold-down belt roller members 421. In the present embodiment, the hold-down belt 43 is in the form of a roller chain, but is not limited thereto.

Figure 10:
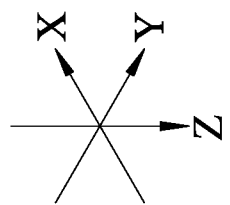
FIG. 10 is a fragmentary perspective view of the frame body unit and a cutting unit of the embodiment.
Figure 10:
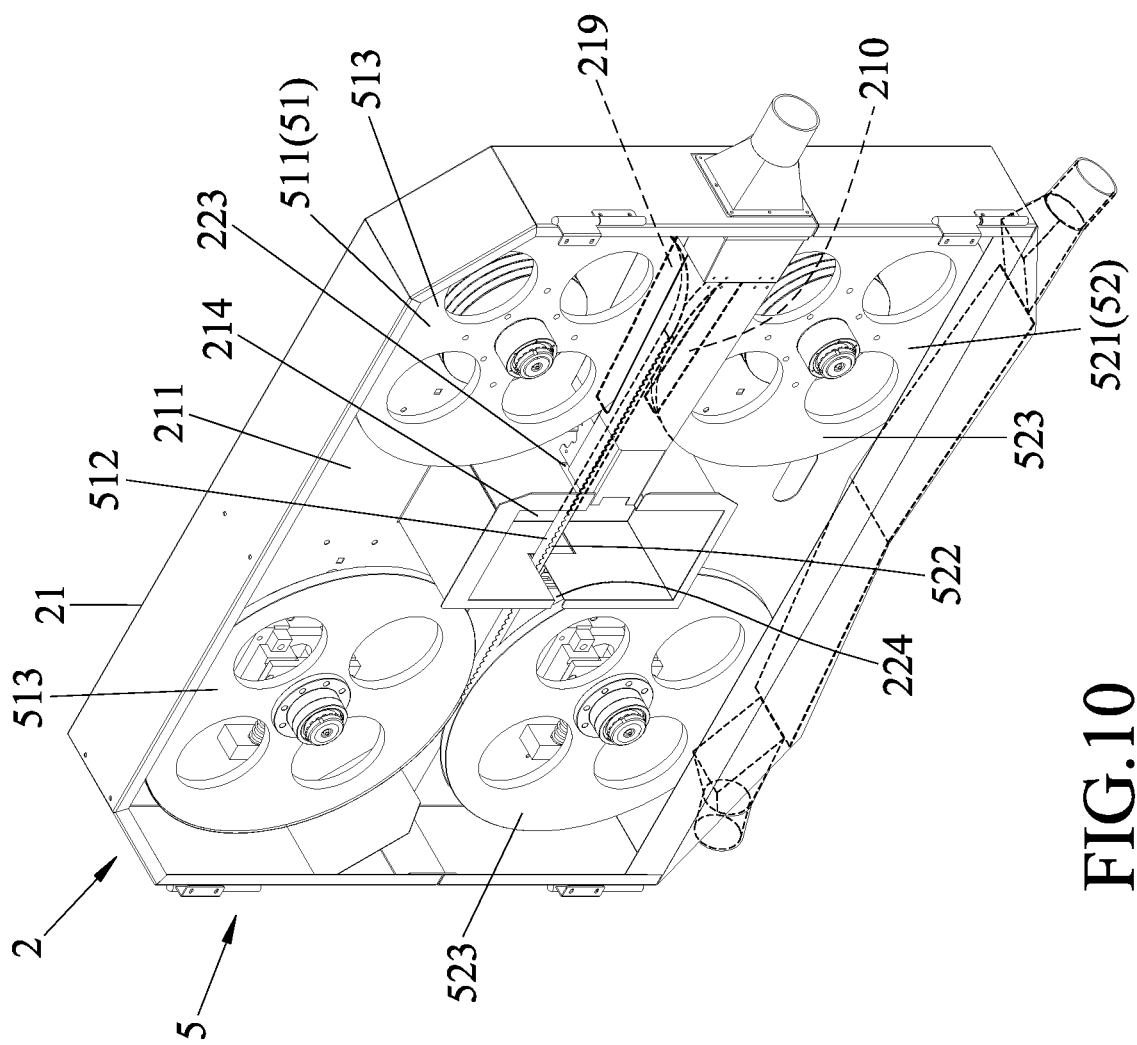

Referring to FIGS. 4, 5 and 10, the cutting unit 5 is connected to the support frame module 21 and includes a first cutter module 51 and a second cutter module 52 disposed under the first cutter module 51 and spaced apart from the first cutter module 51 in the up-down direction (Z).

The first cutter module 51 includes a first wheel set 511 that includes two first wheel members 513 connected to the base plate 211 and spaced apart from each other in the left-right direction (Y) and a first continuous band saw blade 512 trained on the first wheel members 513 and driven rotatably by the two first drive wheel members 513. The first continuous band saw blade 512 has a cutting section travelling alongside the outlet port 214, extending through the first port 223 and the second port 224 of the cutting shroud module 22, disposed between the transport unit 3 and the hold-down unit 4, and adapted to cut the lumber 100.

The second cutter module 52 includes a second wheel set 521 that includes two second wheel members 523 connected to the base plate 211 and spaced apart from each other in the left-right direction (Y), and a second continuous band saw blade 522 trained on the second drive wheels 523 and driven rotatably by the two second wheel members 523. The second continuous band saw blade 522 has a cutting section travelling alongside the outlet port 214, extending through the first port 223 and the second port 224 of the cutting shroud module 22, disposed between the first cutter module 51 and the transport unit 3, and that is adapted to cut the lumber 100.

One of the first wheel member 513 and the first continuous band saw blade 512 extend into the air guide duct 2181 (see FIG. 7) through the upper aperture 219. One of the second wheel members 523 and the second continuous band saw blade 522 extend into the air guide duct 2181 through the lower aperture 210.

Figure 11:
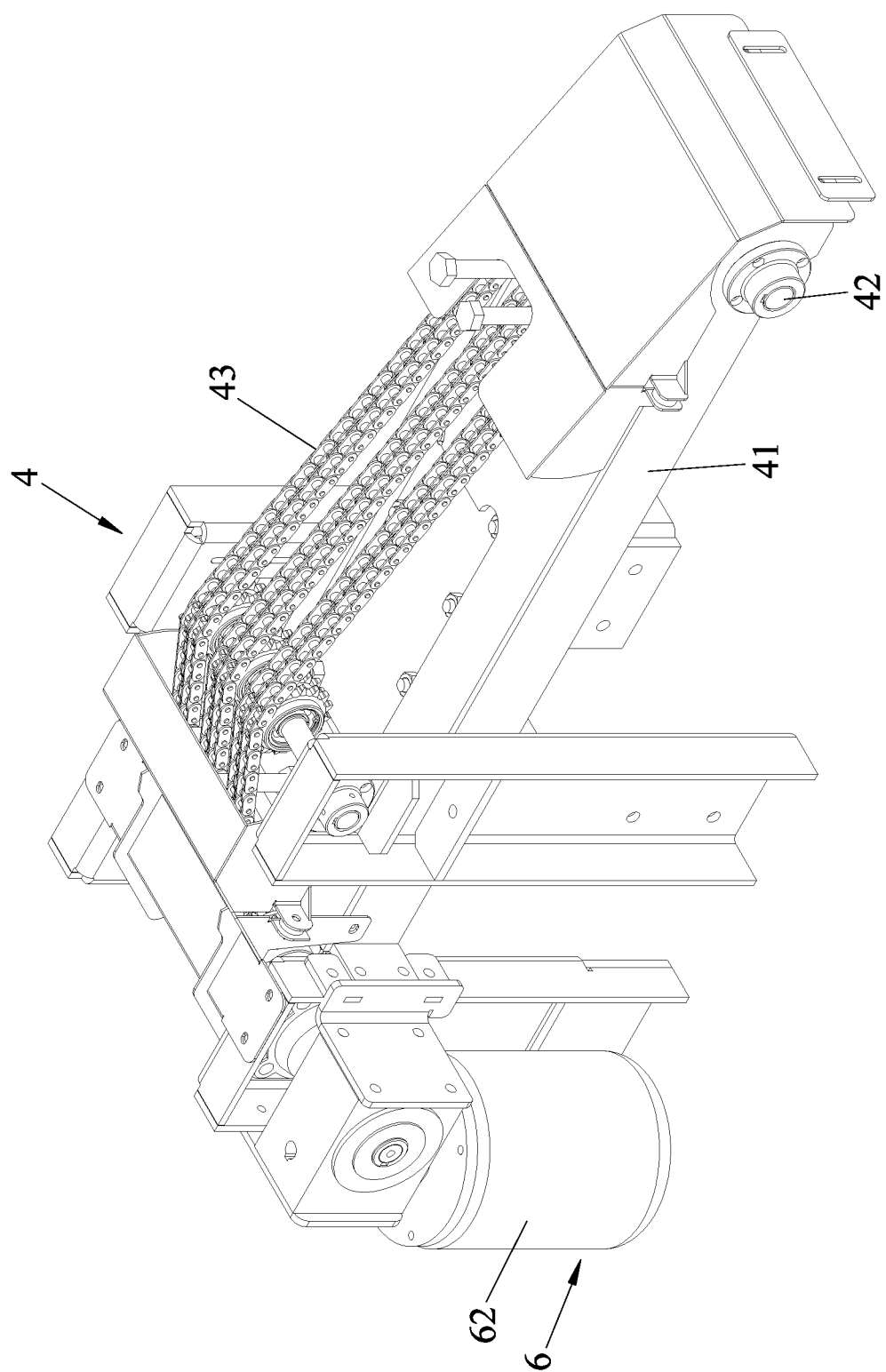
FIG. 11 is a perspective view of the embodiment from another perspective to that of FIG. 9.

Referring to FIGS. 4, 5 and 11, the drive unit 6 is disposed on the frame body unit 2, and includes a transport unit drive motor 61 and a hold-down unit drive motor 62 that are connected respectively to the transport pulley set 32 and the hold-down belt roller set 42 and that are operable for respectively and synchronously driving rotations of said transport pulley members 321 and said hold-down belt roller members 421 to rotate the endless conveyor belt 33 and the endless hold-down belt 43. The drive unit 6 further includes a first main drive motor 63 that is connected to the first wheel set 511 and that is operable for driving rotation of the first wheel members 513 to rotate the first continuous band saw blade 512, and a second main drive motor 64 that is connected to the second wheel set 521 and that is operable for driving rotation of the second wheel members 523 to rotate the second continuous band saw blade 322.

Referring to FIGS. 4 and 8, the feed vise unit 7 includes an upstanding fixed jaw plate 711 disposed on the conveying table 31 of the transport unit 3 to the right of the conveying belt 33 at upstream to the first continuous band saw blade 512, a positioning plate 712 disposed to the left of the conveyor belt 33 and movable parallel to the left-right direction (Y) a movable jaw plate 713 disposed between the fixed jaw plate 711 and the positioning plate 712, and two cushioning members 714 connected between the movable jaw plate 713 and the positioning plate 712. When the positioning plate 712 is actuated to move parallel to the left-right direction (Y), the movable jaw plate 713 is driven to move parallel to the left-right direction (Y) relative to the fixed jaw 711. In the present embodiment, the cushioning members 714 are springs, but are not limited thereto.

Before starting the cutting operation of lumber 100, the exhaust fan is connected to the air vent 217.

Referring to FIGS. 4, 7 and 8, when starting the cutting operation, the lumber 100 is laid on the conveyor belt 33 of the transport unit 3 at upstream to the inlet port 215, and the movable jaw plate 713 and the fixed jaw plate 711 are manipulated to abut respectively against left and the right lateral sides of the lumber 100 to restrict the cutting width of the lumber 100 in the left-right direction (Y).

Referring to FIGS. 4, 5 and 10, the lumber 100 is carried downstream by the conveyor belt 33. When the lumber 100 is moved under the hold-down belt 43, hold-down belt 43 clamps down the lumber 100 to maintain it firmly against the conveyor belt 33 in the up-down direction (Z).

Since the transport pulley set 32 and the hold-down belt roller set 42 are driven synchronously by the transport unit drive motor 61 and the hold-down unit drive motor 62 (see FIGS. 4 and 11) for rotating the endless hold-down belt 43 and the endless conveyor belt 33, the problem of movement speed loss caused by the unpowered hold-down unit in the prior art can be obviated.

With the rotation of the conveyor belt 33 and the hold-down belt 43, the lumber 100 is carried through the inlet port 215 to get cut by the first and second continuous band saw blades 512, 522, the lumber 100 will be cut into three thinner pieces when moving past the first and second continuous band saw blades 512, 522. Since the hold down belt 43 loops from upstream of the inlet port 215 to downstream of the outlet port 214, and the first continuous band saw blade 512 and the second continuous band saw blade 522 transversely extend between the inlet port 215 and the outlet port 214, during the cutting operation, the hold-down belt 43 will continue to maintain the lumber 100 firmly against the conveyor belt 33 from upstream of the inlet port 215 where the lumber 100 has yet been cut to downstream of the outlet port 214 where the lumber 100 has been cut, so as to restrict the lumber 100 in the up-down direction (Z) to enhance stability.

Referring to FIGS. 4, 5, and 7, a portion of the sawdust (not shown) produced during the cutting operation of the lumber 100 falls to the bottom wall portion 2122 of the surrounding wall 212 of the support frame module 21 and slides down along the inclined segments 2127 and the extension segment 2128. An additional exhaust fan may be connected at the discharge ports 216 to draw the sawdust to be discharged via the discharge ports 216. The remaining sawdust will be entrained by the airflow created by the exhaust fan connected at the air vent 217 to be discharged from the air vent 217 through the first port 223 and the air guide duct 2181, so that it will not accumulate on the conveyor belt 33 and affects the sawing effect.

The three pieces of the lumber 100 are continued to be carried downstream by the endless conveyor belt 33 and the endless hold-down belt 43 to exit the outlet port 214 to and thus completing the cutting operation.

It is noted that, the door panels 2131 of the cover plate 213 are normally closed during cutting operation to prevent scattering of sawdust attached to the first and the second continuous band saw blades 512, 522, whereas at down time, the door panels 2131 can be opened for cleaning the sawdust attached to surfaces of the support frame module 21, the cutting shroud module 22 and other components, and enabling accessibility for maintenance as well.

In addition, in the present embodiment, the first wheel set 511 and the first continuous band saw blade 512 are disposed in front of the base plate 211, the second wheel set 521 and the second continuous band saw blade 522 are also disposed in front of the base plate 211. In other embodiments, the first wheel set 511, the first continuous band saw blade 512, the second wheel set 521, and the second continuous band saw blade 522 may either be disposed behind the base plate 211. In this variation, the surrounding wall 212 is connected to the rear of and projects rearward from the base plate 211, and the cover plate 213 is connected to the rearward free end of the surrounding wall 212. Similar to the aforementioned embodiment, the first continuous band saw blade 512 and the second continuous band saw blade 522 are adapted to cut the lumber 100 in an interspace between the transport unit 3 and the hold-down unit 4 with the respective cutting sections travelling alongside the outlet port 214.

In summary, with the installation of the hold-down belt roller set 42, the endless hold-down belt 43, and the hold-down unit drive motor 62 as disclosed, the hold-down belt roller set 42 can be driven by the hold-down unit drive motor 62 and in turn drive the endless hold-down belt 43, rather than being frictionally driven by the lumber 100 as in the prior art. Therefore, the endless hold-down belt 43 and the endless conveyor belt 33 are arranged to cooperatively move the lumber 100, thereby obviating the movement speed loss of the lumber caused by friction resistance between the lumber and the unpowered hold-down unit as in the prior art. Moreover, through the arrangement of the inclined segment 2127, the extension segment 2128, the vent housing 218, the first port 223 and the air vent 217, the sawdust falling on the bottom wall 2122 of the surrounding wall 212 of the support frame module 21 will slide down along the slope of the inclined segment 2127 and the extension segment 2128 to be discharged from the sawdust discharge port 216, the remaining sawdust will be discharged from the air vent 217 through the first port 223 and the air guide duct 2181.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A band saw machine for cutting a lumber, said band saw machine comprising:
    a frame body unit including a support frame module, said support frame module having an upright base plate that is formed with an outlet port extending therethrough in a front-rear direction;
    a transport unit including a conveyor table that is connected to said frame body unit and that extends in said front-rear direction through said outlet port, a transport pulley set that includes a plurality of transport pulley members mounted on said conveyor table and spaced apart from each other in said front-rear direction, and an endless conveyor belt that is trained on said plurality of transport pulley members and that is driven rotatably by said transport pulley members to convey the lumber;
    a hold-down unit including a track frame that is connected to said frame body unit and that extends in said front-rear direction through said outlet port, a hold-down belt roller set that includes a plurality of hold-down belt roller members mounted to said track frame and spaced apart from each other in said front-rear direction, and an endless hold-down belt that is trained on said plurality of hold-down belt roller members and that is driven rotatably by said hold-down belt roller members;
    a cutting unit connected to said support frame module and including a first cutter module, said first cutter module including a first wheel set that includes a plurality of first wheel members connected to said base plate and spaced apart from each other in a left-right direction which is perpendicular to said front-rear direction, and a first continuous band saw blade trained on said plurality of first wheel members and driven rotatably by said first wheel members, said first continuous band saw blade having a cutting section that travels alongside said outlet port, that is disposed between said transport unit and said hold-down unit, and that is adapted to cut said lumber; and
    a drive unit including a transport unit drive motor and a hold-down unit drive motor that are connected respectively to said transport pulley set and said hold-down belt roller set, and that are operable for respectively and synchronously driving rotations of said transport pulley members and said hold-down belt roller members to rotate said endless conveyor belt and said endless hold-down belt, said drive unit further including a first main drive motor that is connected to said first wheel set and that is operable for driving rotation of said first wheel members to rotate said first continuous band saw blade;
    wherein said support frame module of said frame body unit further has a surrounding wall projecting forward from a periphery of said base plate, and a cover plate connected to a front end of said surrounding wall and formed with an inlet port that extends therethrough and that is in alignment with said outlet port, said endless conveyor belt of said transport unit and said hold-down belt of said hold-down unit extending through said inlet port and said outlet port; and
    wherein said frame body unit further includes a cutting shroud module having a shroud body that extends forward and parallel to said front-rear direction from said base plate, and that defines a feed channel communicating with said outlet port and said inlet port, said transport unit and said hold-down unit extending through said feed channel, said shroud body having a first port and a second port that are formed respectively on opposite sides of said shroud body in said left-right direction, said cutting section of said first continuous band saw blade extending through said first and second ports.

2. The band saw machine as claimed in claim 1, wherein said first wheel set and said first continuous band saw blade of said first cutter module are disposed in front of said base plate.

3. The band saw machine as claimed in claim 1, wherein said cover plate of said support frame module has two door panels defining said inlet port and operable between an open position and a closed position.

4. The band saw machine as claimed in claim 1, wherein:
said surrounding wall of said support frame module has a top wall portion, a bottom wall portion disposed under said top wall portion, a first side wall portion connected between said top wall portion and said bottom wall portion and facing said first port, and a second side wall portion connected between said top wall portion and said bottom wall portion and facing said second port;
said bottom wall portion has a generally inverted V-shaped profile section formed by a central crest,
two inclined segments that extend respectively, obliquely and downwardly from opposite ends of said central crest, and
two extension segments that extend respectively from lower ends of said two inclined segments; and
said support frame module further has two sawdust discharge ports extending respectively through said extension segments of said bottom wall and located respectively adjacent to said inclined segments of said bottom wall.

5. The band saw machine as claimed in claim 4, wherein said two extension segments of said bottom wall portion extend respectively, obliquely and upwardly from said inclined segments of said bottom wall portion.

6. The band saw machine as claimed in claim 1, wherein:
said surrounding wall of said support frame module has a top wall portion, a bottom wall portion disposed under said top wall portion, and first and second side wall portions connected between said top wall portion and said bottom wall portion;
said support frame module further has an air vent extending through said first side wall portion of said surrounding wall, and a vent housing connected to said base plate and cooperating with said base plate to define an air guide duct therebetween, said air guide duct having opposite ends that communicate respectively with said first port of said cutting shroud module and said air vent.

7. The band saw machine as claimed in claim 6, wherein said cutting unit further includes a second cutter module disposed under and spaced apart from said first cutter module, said second cutter module including a second wheel set that includes a plurality of second wheel members connected to said base plate and spaced apart from each other in said left-right direction, and a second continuous band saw blade trained on said plurality of second drive wheels and driven rotatably by said second wheel members, said second continuous band saw blade having a cutting section that travels alongside said outlet port, that extends through said first and second ports of said cutting shroud body, that is disposed between said first cutter module and said transport unit, and that is adapted to cut said lumber.

8. The band saw machine as claimed in claim 7, wherein said support frame module of said frame body unit further has an upper aperture formed through a top of said vent housing and communicating with said air guide duct, and a lower aperture formed through a bottom of said vent housing and communicating with said air guide duct, one of said first wheel members and said first continuous band saw blade extending into said air guide duct through said upper aperture, one of said second wheel members and said second continuous band saw blade extending into said air guide duct through said lower aperture.

* * * * *